United States Patent
Hicks et al.

(10) Patent No.: US 10,371,262 B2
(45) Date of Patent: Aug. 6, 2019

(54) TRANSITION GASKET

(71) Applicant: THE FORD METER BOX COMPANY, INC., Wabash, IN (US)

(72) Inventors: William Curtis Hicks, Moody, AL (US); Adam Stacey Pennington, Talladega, AL (US); Earl Sinjon Bradberry, Vestavia Hills, AL (US)

(73) Assignee: The Ford Meter Box Company, Inc., Wabash, IN (US)

( * ) Notice: Subject to any disclaimer, the term of this patent is extended or adjusted under 35 U.S.C. 154(b) by 38 days.

(21) Appl. No.: 15/076,032

(22) Filed: Mar. 21, 2016

(65) Prior Publication Data
US 2016/0281890 A1    Sep. 29, 2016

Related U.S. Application Data

(60) Provisional application No. 62/138,109, filed on Mar. 25, 2015.

(51) Int. Cl.
| | |
|---|---|
| *F16L 21/04* | (2006.01) |
| *F16J 15/10* | (2006.01) |
| *F16J 15/02* | (2006.01) |
| *F16L 21/02* | (2006.01) |
| *F16L 25/14* | (2006.01) |

(52) U.S. Cl.
CPC ............ *F16J 15/10* (2013.01); *F16J 15/021* (2013.01); *F16L 21/022* (2013.01); *F16L 21/04* (2013.01); *F16L 25/14* (2013.01)

(58) Field of Classification Search
CPC .......... F16L 25/14; F16L 21/04; F16L 21/007
USPC .................................................. 285/342, 343
See application file for complete search history.

(56) References Cited

U.S. PATENT DOCUMENTS

| | | | | |
|---|---|---|---|---|
| 663,879 | A | * | 12/1900 | Gallup .................. F16L 55/178 285/342 |
| 870,428 | A | * | 11/1907 | Graham .................. F16L 21/03 285/342 |
| 1,983,228 | A | * | 12/1934 | Hall ........................ F16L 21/04 285/356 |
| 2,269,695 | A | * | 1/1942 | Scharf ..................... F16L 19/08 285/342 |
| 2,452,278 | A | * | 10/1948 | Woodling ............... F16L 19/12 285/343 |

(Continued)

FOREIGN PATENT DOCUMENTS

| | | | | |
|---|---|---|---|---|
| EP | 1281907 A2 | * | 2/2003 | ............. F16L 21/04 |
| JP | WO 2011155082 A1 | * | 12/2011 | ............. F16L 21/04 |

*Primary Examiner* — David Bochna
(74) *Attorney, Agent, or Firm* — Barnes & Thornburg LLP

(57) ABSTRACT

A mechanical pipe joint assembly is provided that connects pipes of different diameters. The mechanical pipe joint assembly includes an annular pipe socket end with an annular cavity located adjacent thereto. A gasket includes first and second sections. The first section includes an arcuate head and an abutment adjacent the arcuate head. The second section includes a lip extension located adjacent the abutment of the first section. The arcuate head of the first portion of the gasket is configured to be circumscribed in the annular cavity of the annular pipe socket. The lip extension of the gasket is configured to be located underneath a tab on a gland portion of the joint assembly and configured to fill space underneath the tab and above the pipe wall.

5 Claims, 6 Drawing Sheets

(56) References Cited

U.S. PATENT DOCUMENTS

| | | | | | |
|---|---|---|---|---|---|
| 4,295,668 | A | * | 10/1981 | Louthan | ............... F16L 47/24 285/342 |
| 5,803,513 | A | * | 9/1998 | Richardson | ............ F16L 21/08 285/342 |
| 2005/0218652 | A1 | * | 10/2005 | Sakamoto | ............... F16L 21/04 285/343 |

* cited by examiner

TRANSITION GASKET

RELATED APPLICATION

The present application relates to and claims priority to U.S. Provisional Patent Application Ser. No. 62/138,109, filed on Mar. 25, 2015. The subject matter disclosed in that provisional application is hereby expressly incorporated into the present application.

BACKGROUND AND SUMMARY

The present disclosure is related to water works pipe connector assemblies and, particularly, a transition gasket that assists in sealing connected pipes of differing diameters.

Piping systems used in the water works industry are often joined using a mechanical joint connection. These piping systems often use restraint devices to prevent the pipe joints from separating as a result of system pressurization. In many cases, in addition to providing axial thrust restraint, these devices also serve as mechanical joint glands in a standard mechanical joint connection. The restraining means of these devices may deform the pipe to which it is attached. This may likewise distort the outer diameter (OD) of the pipe and exacerbate the problems associated with misalignment of the mechanical joint connection as described above. The gasket portion of the mechanical joint may possibly mitigate the effects of this distortion. The mechanical joint connection is described in the American Water Works Association (AWWA) Standard for Rubber-Gasket Joints for Ductile-Iron Pressure Pipe and Fittings, ANSI/AWWA C111/A21.11. A mechanical joint connection is characterized by compressing a gasket in a socket cavity that creates a seal between the end of a pipe and the pipe or fitting to which the mechanical joint socket and bolting flange are attached. A gland is used to compress the gasket in the mechanical joint socket cavity by bolting the gland to the socket. Gland, gasket, connecting bolt, and socket geometries have all been standardized for the purpose of joining pipes and fittings.

A prior art gasket used in a mechanical joint connection is referred to as a mechanical joint gasket. It has a standard size and design. The mechanical joint gasket is used with a mechanical joint gland to connect pipes having cast-iron-pipe-equivalent (CI) outside diameters of the mechanical joint socket. Such a gasket does not work as well on a steel-pipe-equivalent (IPS) outer diameter pipe, however, because the connecting pipe diameter is different, typically smaller.

An illustrative embodiment of the present disclosure provides a mechanical pipe joint assembly configured to connect pipes of different diameters. The mechanical pipe joint assembly comprises: an annular pipe socket end having an annular flange extending outwardly from the annular pipe socket end and an annular cavity located adjacent an inner periphery of the pipe socket end and the annular flange; an annular gland having a pipe bore disposed therethrough configured to receive a pipe that engages the annular pipe socket; the annular gland further includes an annular tab located adjacent a periphery of the pipe bore; the annular tab extends toward the annular cavity of the annular pipe socket when the gland is directed toward the annular pipe socket; a gasket that includes an annular body having a bore disposed therethrough configured to receive the pipe; the gasket includes first and second sections wherein the first section includes a arcuate head and an abutment adjacent the arcuate head; the second section includes a lip extension located adjacent the abutment of the first section, extending opposite the arcuate head of the first section; the lip extension has less thickness than at least a portion of the arcuate head; the arcuate head of the first portion of the gasket is configured to be circumscribed in the annular cavity of the annular pipe socket; the lip extension of the gasket is configured to be located underneath the annular tab of the gland and configured to fill space underneath the annular tab and the pipe; and the annular tab of the gland is engagable with the abutment of the gasket and configured to apply a force toward the arcuate head against the annular cavity of the annular pipe socket.

The above and other embodiments of the present disclosure may further comprise: a fastener that draws the gland and the annular pipe socket toward each other which applies a force against the first and second sections of the gasket which are configured to fill the space between the annular pipe socket and pipe; and wherein the head may include an arcuate surface.

Another illustrative embodiment of the present disclosure provides another mechanical pipe joint assembly configured to connect pipes of different diameters. The mechanical pipe joint assembly comprises: an annular pipe socket end that includes an annular cavity; an annular gland having a pipe bore disposed therethrough configured to receive a pipe that engages the annular pipe socket; the annular gland further includes an annular tab located adjacent a periphery of the pipe bore; the annular tab extends toward the annular cavity of the annular pipe socket when the gland is directed toward the annular pipe socket; a gasket that includes an annular body having a bore disposed therethrough configured to receive the pipe; the gasket includes first and second sections wherein the first section includes a head and an abutment adjacent the head; the second section includes a lip extension located adjacent the abutment of the first section and extending opposite the head of the first section; the head of the first portion of the gasket is configured to be circumscribed in the annular cavity of the annular pipe socket; wherein the annular tab of the gland is configured to set on top of the lip extension of the gasket; and the annular tab of the gland is engagable with the abutment of the gasket.

Another illustrative embodiment of the present disclosure provides a gasket configured to seal a mechanical pipe joint having an annular pipe socket and a gland with a tab extending therefrom. The gasket includes an annular body having a bore disposed therethrough configured to receive the pipe; first and second sections wherein the first section includes an arcuate head and an abutment adjacent the arcuate head; the second section includes a lip extension located adjacent the abutment of the first section and extends opposite the arcuate head of the first section; and the arcuate head of the first portion of the gasket is configured to be circumscribed in the annular pipe socket of the mechanical pipe joint and the lip extension of the second section is configured to fit underneath the tab of the gland while the tab of the gland is configured to apply a lateral force against the abutment of first section.

Additional features and advantages of the transition gasket will become apparent to those skilled in the art upon consideration of the following detailed description of the illustrated embodiment exemplifying the best mode of carrying out the transition gasket as presently perceived.

BRIEF DESCRIPTION OF THE DRAWINGS

The present disclosure will be described hereafter with reference to the attached drawings which are given as non-limiting examples only, in which.

Additional features and advantages of the disclosure will become apparent to those skilled in the art upon consideration of the following detailed descriptions exemplifying the best mode of carrying out the invention as presently perceived.

DETAILED DESCRIPTION

An illustrative embodiment of the present disclosure provides a transition gasket that may be used instead of a mechanical joint gasket. The transition gasket is configured to assist connecting a pipe with steel-pipe-equivalent (IPS) outside diameters to a mechanical joint socket for a pipe that typically has a cast-iron-pipe-equivalent (CI) outside diameter. For a nominal size, IPS outside diameters are smaller than CI outside diameters. In other words, the transition gasket helps connect pipes having different outside diameters. The transition gasket of the present disclosure provides additional rubber material when compared to a conventional mechanical joint gasket. The additional material allows sufficient compression to seal the joint because of the increase in annular space between the pipe and the mechanical joint socket as a result of a smaller pipe diameter. Illustratively, the transition gasket may be installed in the same manner (i.e., insertion into the cavity created by the mechanical joint socket and the pipe) as a mechanical joint gasket.

Figure 1:
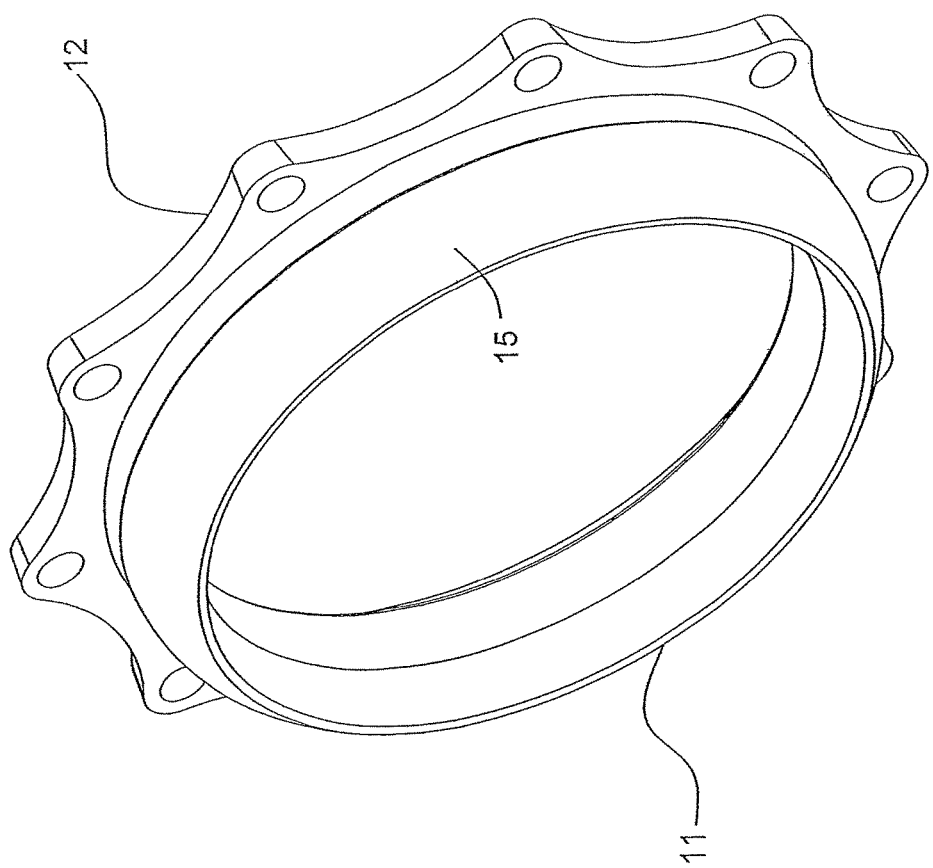
FIG. 1 is an isometric view of a transition gasket of the present disclosure coupled to a mechanical joint gland.

An isometric view of a transition gasket 11 of the present disclosure coupled to a mechanical joint gland 12 is shown in FIG. 1 It is appreciated that transition gasket 11 may be used for connection of steel-pipe-equivalent outside diameter to a mechanical joint socket that meets AWWA C111 specifications or other smaller diameter pipes. Illustratively, gasket 11 may provide assistance in centering the compression gland with respect to the gasket as the gasket is installed. This may be useful in the case of a mechanical joint that also serves as a restraint 16 (see, also, FIG. 5). Further, gasket 11 may reduce the need to retighten the connecting bolts due to the fact that the gasket geometry is less likely to protrude into the annular space.

Figure 2:
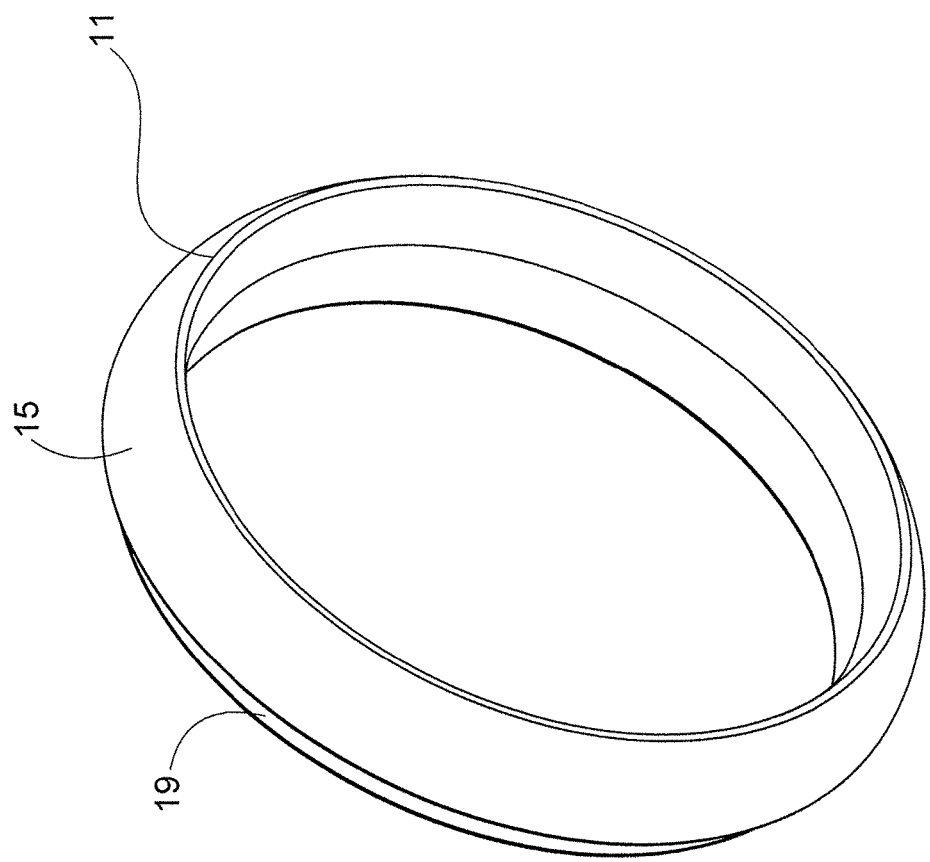
FIG. 2 is a perspective view of the transition gasket of FIG. 1.
Figure 3:
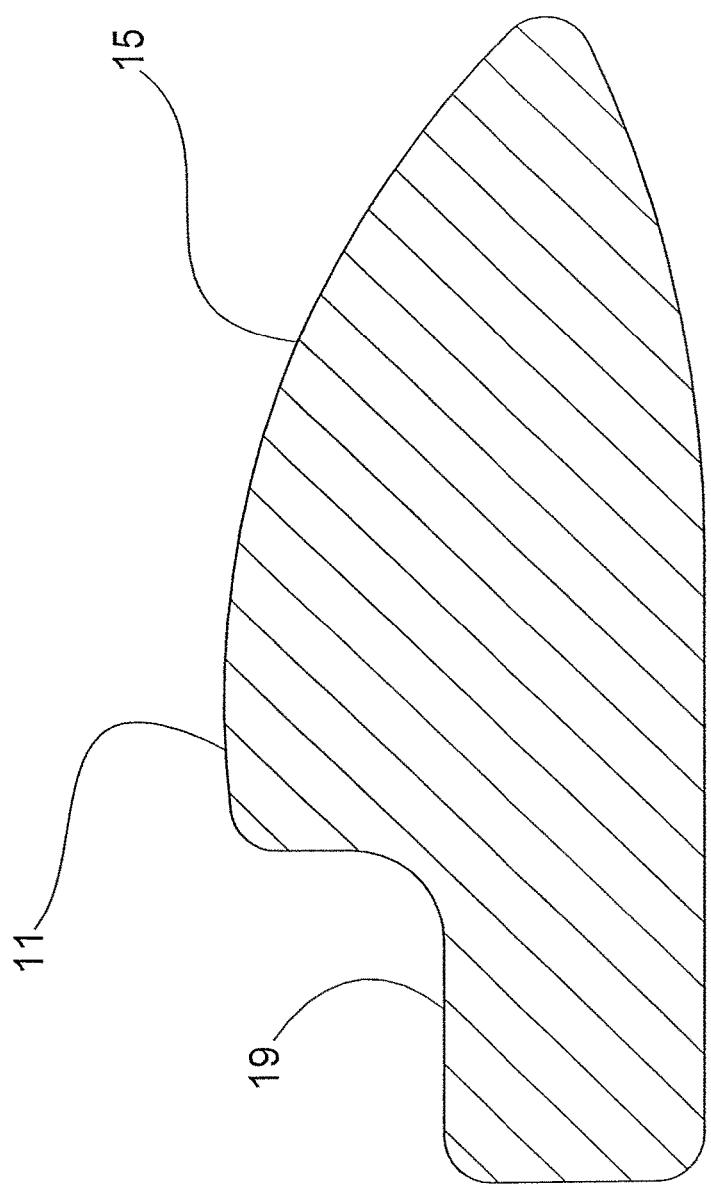
FIG. 3 is a cross-sectional view of the transition gasket of FIG. 1.
Figure 4:
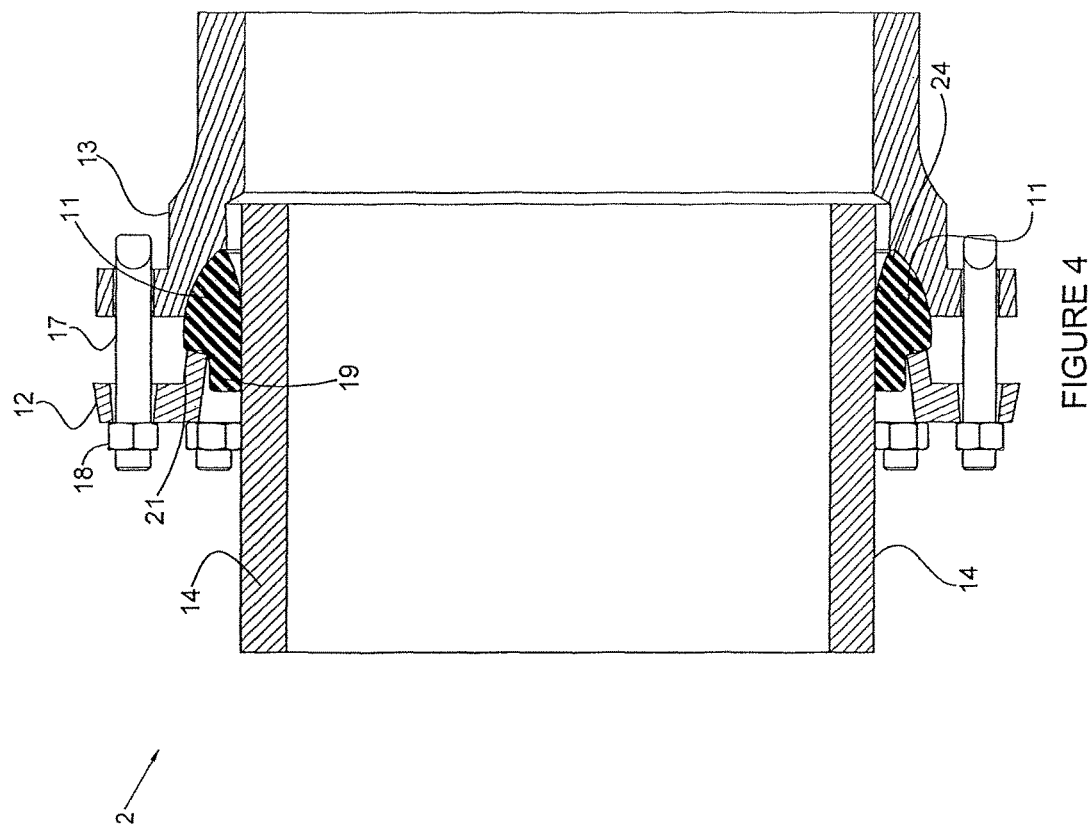
FIG. 4 is a cross-sectional view of a mechanical joint showing full transition gasket insertion into the mechanical joint socket for a completed installation.
Figure 6:
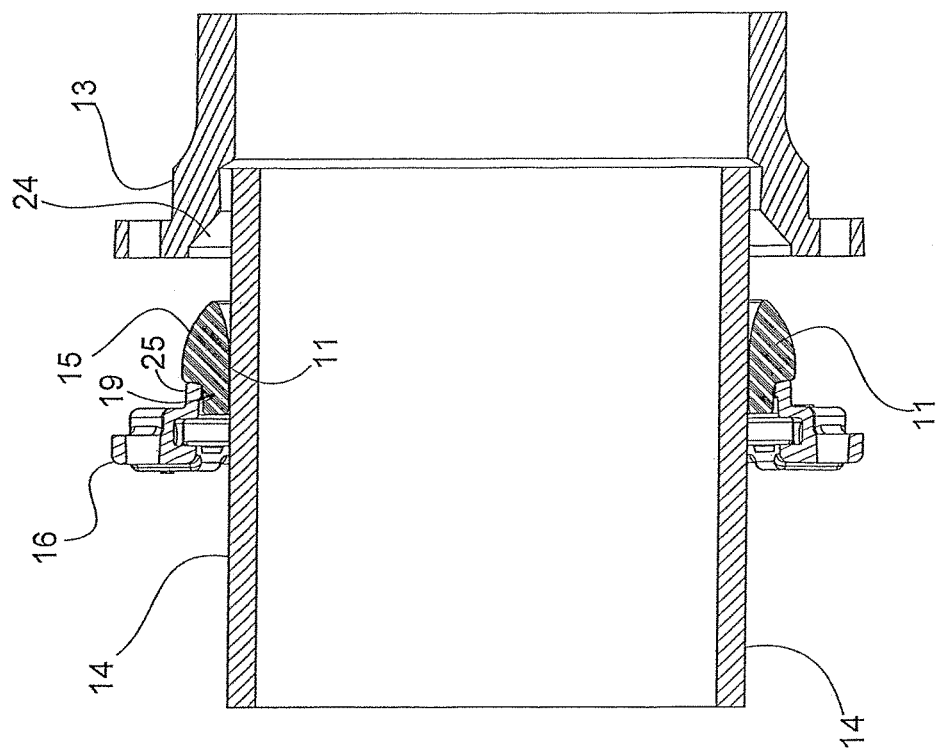
FIG. 6 is a cross-sectional view of the transition gasket of FIG. 1 being inserted into another mechanical joint socket.

As shown in the perspective and cross-sectional views of FIGS. 2 and 3, gasket 11 includes a lip extension 19 that fills the gap created by the smaller diameter pipe (see also FIGS. 4 and 6). Lip extension 19 may also facilitate attachment to a standard sized mechanical joint gland. Outer diameter lip 19 of gasket 11 fits inside the inner diameter of mechanical joint gland 12, securing gland 12 and gasket 11 together. Illustratively, transition gasket 11 may be made of rubber or other like material.

A cross-sectional view of a mechanical joint 2, depicting how transition gasket 11 assists coupling pipe 14 into a mechanical joint socket 13, is shown in FIG. 4. Mechanical joint gland 12 inserts transition gasket 11 into mechanical joint socket 13. Lip extension 19 of Gasket 11 is secured into mechanical joint gland 12 as shown. Illustratively, lip extension 19 fits snuggly under compression lip 21 of mechanical joint gland 12. After attachment, lip extension 19 fills the annular volume resulting from the reduced diameter of pipe 14 as shown. Gasket 11 moves into cavity 24 creating a seal between pipe 14 and the interior surface of mechanical joint socket 13. As gasket 11 travels further into cavity 24 of socket 13, it assists centering mechanical joint gland 12 around pipe 14 relative to socket 13. The result is a more uniform application of compression force around the circumference of gasket 11. This may improve efficacy and allow for a greater margin of error when creating the seal between gasket 11 and pipe 14. This also helps when there is a reduction in the pipe's outer diameter due to restraint. A plurality of bolts 17 and nuts 18 secure gland 12 to socket 13, as illustratively shown.

It is appreciated that gasket 11 has been designed to function when the diameter of inserted pipe 14 is a steel-pipe-equivalent outside diameter. When gasket 11 is used for steel-pipe-equivalent outside diameter, the mechanical joint socket 13 dimensions do not change. This results in a larger annular cavity between the mechanical joint socket 13 and pipe 14 as steel-pipe-equivalent outside diameters are generally smaller than cast-iron-pipe-equivalent outside diameters of the same nominal diameter. Gasket 11 has been designed with additional material that will fill the cavity 24 of socket 13 without modifications. A curved profile 15 on gasket 11 allows it to travel smoothly along the inner surface of mechanical joint socket 13 and compress against the inserted pipe.

Figure 5:
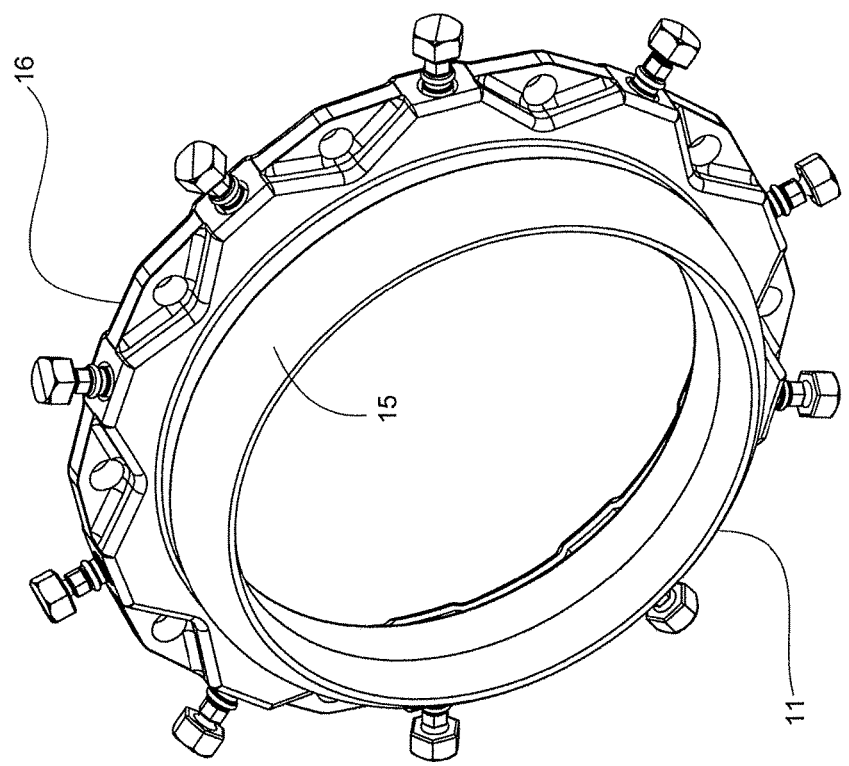
FIG. 5 is an isometric view of the transition gasket of FIG. 1 secured to a restraint device that may also serve as a mechanical joint gland.

An isometric view of transition gasket 11 fitted in a restraint 16 is shown in FIG. 5. Similar to gland 12, restraint 16 may be used in conjunction with mechanical joint socket 13 to connect with pipe 14. As shown in the cross-sectional view of FIG. 6, transition gasket 11 may be used with restraint 16 to attach pipe 14 to socket 13. As depicted, lip 19 fits under a compression lip 25 of restraint 16. Curved profile 15 and lip extension 19 of transition gasket 11 may then be fitted into and extend from cavity 24 of socket 13 to assist providing a seal between the same and pipe 14. Like the view shown in FIG. 4, bolts and nuts 17 and 18, respectively, may be used to connect socket 13 with restraint 16.

Corresponding reference characters indicate corresponding parts throughout the several views. The exemplification set out herein illustrates an embodiment of the disclosure, and such exemplification is not to be construed as limiting the scope of the invention in any manner.

The invention claimed is:

1. A mechanical pipe joint assembly comprising:
a first pipe having an outer diameter, an annular pipe socket end located at an end of the first pipe, the annular pipe socket end having an annular flange extending outwardly transverse from a longitudinal extent and the outer diameter of the first pipe, and an annular cavity located adjacent an inner periphery of the annular pipe socket end and the annular flange;
a second pipe having an outer diameter that is different than the outer diameter of the first pipe, wherein the outer diameter of the second pipe is less than the outer diameter of the first pipe;
an annular gland having a pipe bore disposed therethrough configured to receive the second pipe that is disposed in the annular pipe socket end;

wherein the annular gland further includes an annular tab located adjacent but spaced apart from a periphery of the pipe bore;

wherein the annular tab extends toward the annular cavity of the annular pipe socket end when the gland is directed toward the annular pipe socket end;

a gasket that includes an annular body having a bore disposed therethrough configured to receive the second pipe;

wherein the gasket includes first and second sections wherein the first section includes an arcuate head and an abutment adjacent the arcuate head;

wherein the second section includes a lip extension located adjacent the abutment of the first section and extending opposite the arcuate head of the first section;

wherein the lip extension has less thickness than at least a portion of the arcuate head;

wherein the arcuate head of the first section of the gasket is sized to fit into the annular cavity of the annular pipe socket end and fills space between the annular pipe socket end and the outer diameter of the second pipe that is less than the outer diameter of the first pipe;

wherein the lip extension of the gasket is located underneath the annular tab of the gland and fills space between the annular tab and the outer diameter of the second pipe that is less than the outer diameter of the first pipe;

wherein the annular tab of the gland is engagable with the abutment of the gasket and configured to apply a force toward the arcuate head against the annular cavity of the annular pipe socket; and wherein the lip extension of the gasket is compressed between the annular tab of the gland and the outer diameter of the second pipe which creates a seal underneath the annular tab of the gland and between the annular tab of the gland and the outer diameter of the second pipe that is less than the outer diameter of the first pipe.

2. The mechanical pipe joint assembly of claim 1, further comprising a fastener that draws the gland and the annular pipe socket end toward each other which applies a force against the first and second sections of the gasket which are configured to fill the space between the annular pipe socket end and the second pipe.

3. A mechanical pipe joint assembly configured to connect pipes of different diameters, the mechanical pipe joint assembly comprising:

a first pipe that includes an annular pipe socket end that includes an annular cavity;

an annular gland having a pipe bore disposed therethrough configured to receive a second pipe that has a different diameter than the first pipe and that engages the annular pipe socket end;

wherein the annular gland further includes an annular tab located adjacent a periphery of the pipe bore;

wherein the annular tab extends toward the annular cavity of the annular pipe socket end when the gland is directed toward the annular pipe socket end;

a gasket that includes annular body having a bore disposed therethrough configured to receive the second pipe;

wherein the gasket includes first and second sections wherein the first section includes a head and an abutment adjacent the head;

wherein the second section includes a lip extension located adjacent the abutment of the first section and extending opposite the head of the first section;

wherein the head of the first section of the gasket is configured to be circumscribed in the annular cavity of the annular pipe socket;

wherein the annular tab of the gland is configured to set on top of the lip extension of the gasket;

wherein the annular tab of the gland is engagable with the abutment of the gasket;

wherein the lip extension of the gasket is compressed between the annular tab of the gland and the second pipe which creates a seal between the annular tab of the gland and the second pipe; and at least one fastener;

wherein the at least one fastener engages the gland and the annular pipe socket end of the first pipe;

wherein the at least one fastener draws the gland and the annular pipe socket end toward each other.

4. The mechanical pipe joint assembly of claim 3, wherein the head includes an arcuate surface.

5. A gasket configured to seal a mechanical pipe joint having an annular pipe socket and a gland with a tab extending therefrom, the gasket comprising:

an annular body having a bore disposed therethrough configured to receive the pipe;

first and second sections wherein the first section includes an arcuate head and an abutment adjacent the arcuate head;

wherein the arcuate head is arrow-head shaped with a point directed toward the annular pipe socket and opposite the abutment;

wherein the second section includes a lip extension located adjacent the abutment of the first section and extending opposite the point of the arcuate head of the first section;

wherein the lip extension of the second section is oriented substantially perpendicular to the abutment of the first section;

wherein the arcuate head of the first section of the gasket is configured to be circumscribed in the annular pipe socket of the mechanical pipe joint and the lip extension of the second section is configured to fit underneath the tab of the gland while the tab of the gland is configured to apply a lateral force against the abutment of first section.

* * * * *